United States Patent
Bendi et al.

(10) Patent No.: US 9,503,577 B1
(45) Date of Patent: Nov. 22, 2016

(54) EMERGENCY CALL SERVICE FOR GROUPS OF DEVICES WITH A SHARED NUMBER

(71) Applicant: Verizon Patent and Licensing Inc., Arlington, VA (US)

(72) Inventors: Sethumadhav Bendi, Walnut Creek, CA (US); Mingxing S. Li, San Jose, CA (US); Zohar Fuchs, Danville, CA (US); G. Lance Lockhart, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/797,064

(22) Filed: Jul. 10, 2015

(51) Int. Cl.
- *H04M 3/42* (2006.01)
- *H04M 3/46* (2006.01)
- *H04W 4/06* (2009.01)
- *H04W 4/16* (2009.01)
- *H04M 7/12* (2006.01)
- *H04W 4/22* (2009.01)
- *H04M 3/22* (2006.01)

(52) U.S. Cl.
CPC .............. *H04M 3/465* (2013.01); *H04M 3/22* (2013.01); *H04M 3/42* (2013.01); *H04M 3/42102* (2013.01); *H04M 7/128* (2013.01); *H04W 4/06* (2013.01); *H04W 4/16* (2013.01); *H04W 4/22* (2013.01)

(58) Field of Classification Search
CPC ........ H04M 3/42; H04M 3/22; H04M 3/465; H04M 3/42102; H04W 4/06; H04W 4/16; H04W 4/22

USPC ....... 455/414.2, 404.1, 404.2, 456.1; 379/45, 379/37, 142.06, 201.01
See application file for complete search history.

(56) References Cited

U.S. PATENT DOCUMENTS

| | | | | |
|---|---|---|---|---|
| 8,385,232 | B1 * | 2/2013 | Chen | H04M 3/465 370/259 |
| 8,396,445 | B2 * | 3/2013 | Crawford | H04L 45/00 379/37 |
| 8,731,163 | B1 * | 5/2014 | Bates | H04M 15/06 379/142.06 |
| 2010/0316206 | A1 * | 12/2010 | Chang | H04M 3/42008 379/201.01 |
| 2013/0163585 | A1 * | 6/2013 | Kimura | H04L 12/4625 370/352 |
| 2013/0295889 | A1 * | 11/2013 | Das | H04W 4/046 455/414.1 |
| 2014/0307858 | A1 * | 10/2014 | Li | H04M 3/42008 379/37 |
| 2015/0156321 | A1 * | 6/2015 | Abnett | G06Q 50/12 379/45 |
| 2016/0065748 | A1 * | 3/2016 | Li | H04M 3/42195 379/45 |

* cited by examiner

Primary Examiner — Khai M Nguyen

(57) ABSTRACT

Distinct user devices may sometimes share a telephone number. Techniques described herein may provide for the assigning of a temporary telephone number for a user device, which shares a telephone number with other user devices, in certain situations, such as when the user device places a call to an emergency call center. The temporary telephone number may allow the user device to be reached and/or located by the emergency call center.

20 Claims, 7 Drawing Sheets

| Device ID | MDN | Location | TMDN | TMDN timestamp |
|---|---|---|---|---|
| 1.2.3.4:1234 | 123-456-7890 | 37.5000° N, 79.0000° W | | |
| 1.2.3.4:4321 | 123-456-7890 | 37.5987° N, 80.0001° W | 555-555-5555 | 6/18/2015 23:52:01 |
| 123456789012345 | 123-456-7890 | 37.5000° N, 79.0000° W | | |
| 4.5.6.7 | 123-456-7890 | 37.6978° N, 78.9998° W | | |
| foo@bar.com | 321-654-0987 | 34.1234° N, 77.4321° W | | |
| 9.8.7.6:5432 | 321-654-0987 | 34.0987° N, 77.7890° W | 555-123-4567 | 6/18/2015 20:15:52 |

EMERGENCY CALL SERVICE FOR GROUPS OF DEVICES WITH A SHARED NUMBER

BACKGROUND

Users of devices may own several devices, such as a smart phone, a Voice over Internet Protocol ("VoIP") phone, a tablet computer, a laptop computer, etc. Some telecommunications service providers provide services whereby a group of devices can send and receive voice calls, using the same telephone number. For example, when a call is placed to the telephone number that corresponds to the group, all of the devices in the group may "ring." Similarly, when a call is placed by any device in the group, the common telephone number of the group may be provided as part of the outgoing call (e.g., as caller identification ("ID")) information.

DETAILED DESCRIPTION OF PREFERRED EMBODIMENTS

The following detailed description refers to the accompanying drawings. The same reference numbers in different drawings may identify the same or similar elements.

Some telecommunications service providers provide services whereby a group of devices can send and/or receive voice calls, using the same telephone number. In some situations, it may be desirable (or required) that a particular device can be separately identified when placing a call, even when the device is part of a group that shares a telephone number. For example, when a particular device, in the group, places an emergency call (e.g., a call to the telephone number, "9-1-1"), it may be undesirable for the shared telephone number to be associated with the call. For example, in situations where the call is disconnected and the emergency call center calls the shared telephone number back, another user device may pick up the call, thereby potentially restricting the caller from answering the call. Further, location validation services that rely on the caller's telephone number may be interfered with, by virtue of the telephone number being a shared telephone number.

Figure 1:
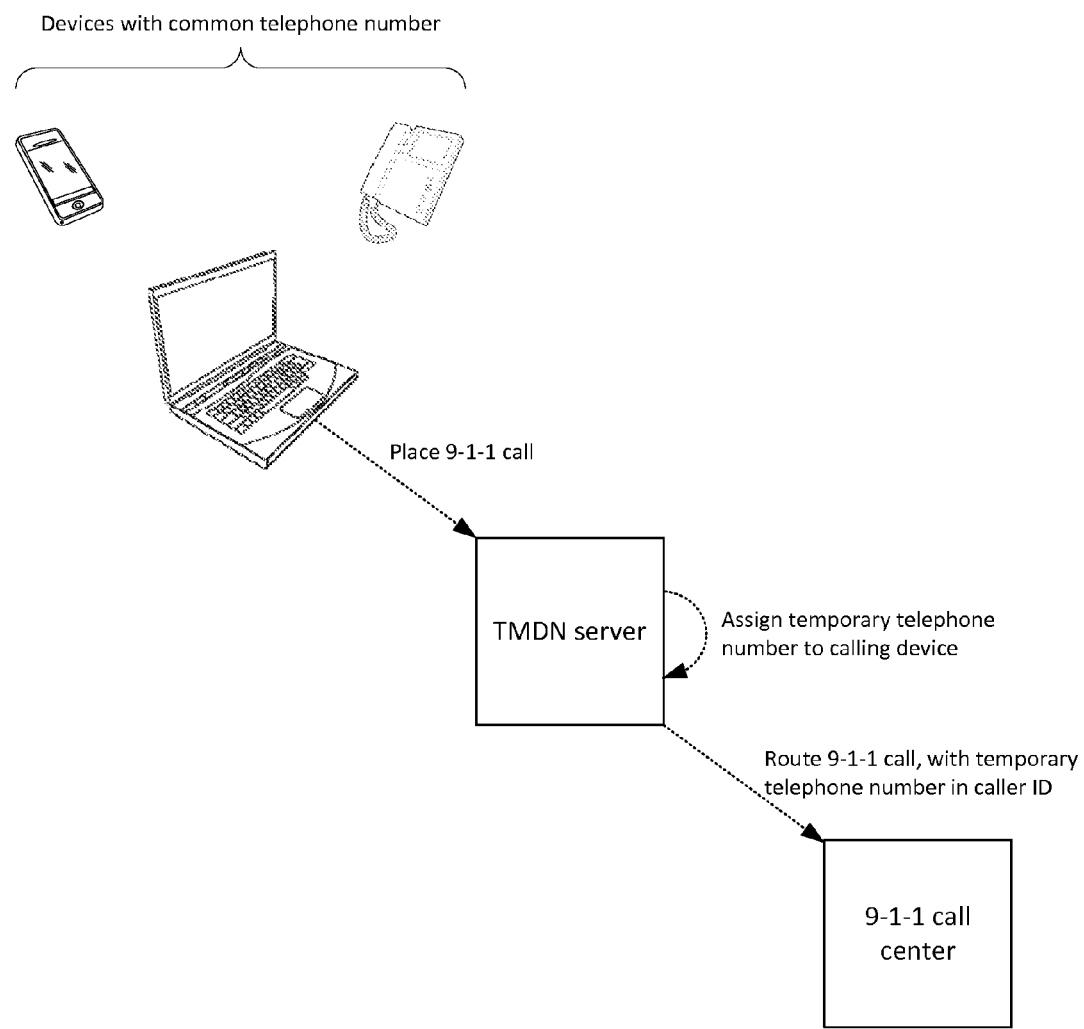
FIG. 1 illustrates an example overview of implementations described herein.

Implementations, describe herein, may provide for the assigning of a temporary telephone number to a user device, that is in a group of user devices that share the same telephone number, in certain situations (e.g., when the user device places an emergency call). For example, as shown in FIG. 1, three example devices (e.g., a smart phone, a laptop computer, and a VoIP phone) may share the same telephone number (sometimes referred to as a Mobile Directory Number ("MDN")). As shown, assume that the laptop computer is used to place an emergency ("9-1-1") call. The call may be placed via, for example, an Internet connection (e.g., a VoIP service or a similar service).

A temporary MDN ("TMDN") server may receive control signaling, indicating that the call has been placed. As described further below, the TMDN server may be a device within a telecommunications network that assists in call routing and/or other types of control signaling. The TMDN server may determine that the call is an emergency call, and has been placed by a device that is in a group of devices that share the same MDN. Based on these determinations, the TMDN server may assign a temporary telephone number (e.g., a TMDN) to the laptop computer, and may route the call to a 9-1-1 call center. The routed call may indicate the TMDN, so that the 9-1-1 call center can call the laptop computer back in case of disconnection, and/or may perform other actions using the TMDN (e.g., may query a location database that is able to ascertain the location of the laptop computer based on the TMDN).

Figure 2:
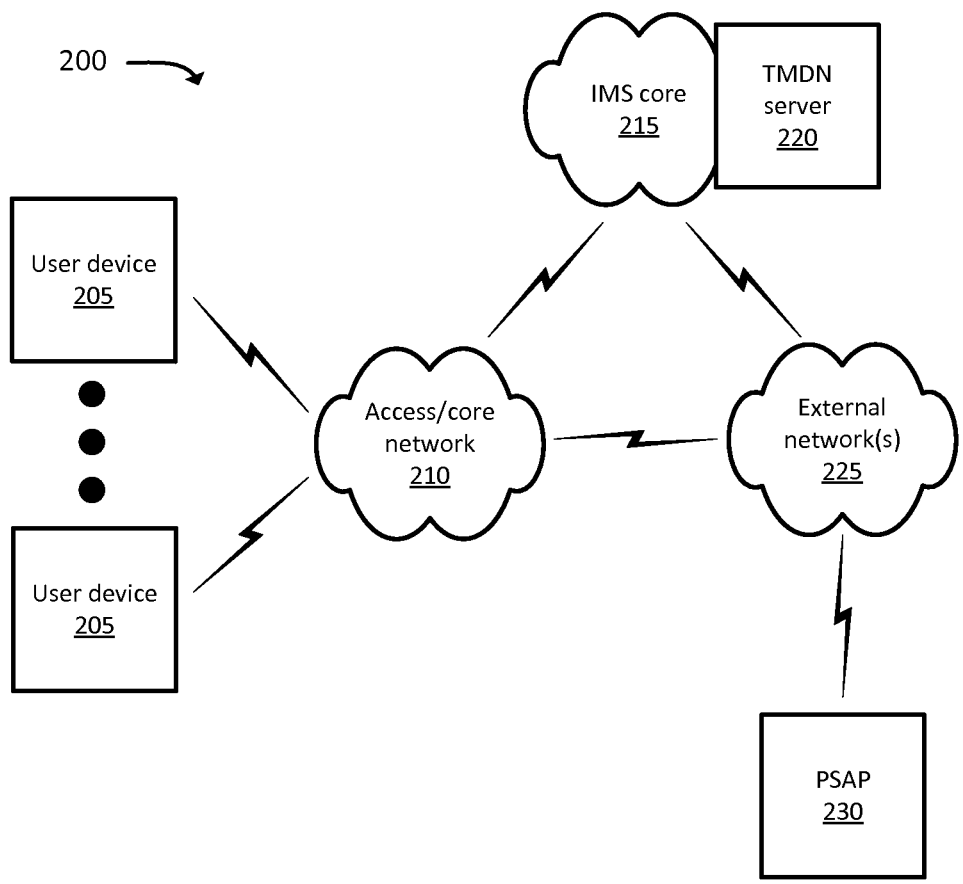
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include one or more user devices 205, access/core network 210, Internet Protocol ("IP") Multimedia Subsystem ("IMS") core 215, TMDN server 220, one or more external networks 225, and public safety answering point ("PSAP") 230.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

User device 205 may include any computation and communication device that is capable of communicating with one or more networks (e.g., access/core network 210 and/or external network 220). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may include logic and/or hardware circuitry to communicate via one or more "short range" wireless protocols, such as Bluetooth Low Energ\y ("BLE"), Near Field Communications ("NFC"), Wi-Fi (e.g., based on an Institute of Electrical and Electronics Engineers Institute of Electrical and Electronics Engineers ("IEEE") 802.11-based standard), ZigBee (e.g., based on an IEEE 802.15.4-based standard), or the like. In some implementations, user device 205 may include one or more wired communication interfaces, such as a Network Interface Card ("NIC"), an RJ45 "Ethernet" interface, an RJ11 interface, etc., via which user device 205 may communicate with one or more networks (e.g., access/core network 210 and/or external network 225).

Access/core network 210 may include one or more networks, via which one or more devices, shown in FIG. 2, may communicate. Generally, access/core network 210 may enable user device 205 to communicate with one or more other devices (e.g., PSAP 230) via external network 225 (which, as described below, may include, for example, the Internet and/or a Public Switched Telephone Network ("PSTN")). For example, access/core network 210 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 205 and/or another device may communicate with the EPC network. The EPC network may include one or more serving gateways ("SGWs"), mobility management entities ("MMEs"), and/or packet data network ("PDN") gateways ("PGWs"), and may enable user device 205 to communicate with one or more other networks (e.g., external network 225) and/or IMS core 215.

In some implementations, access/core network 210 may include one or more other types of RANs, such as a Global System for Mobile ("GSM") RAN, a Universal Mobile Telecommunications System ("UMTS") RAN, etc. In some implementations, access/core network 210 may include a non-cellular wireless network (i.e., a wireless network that operates at an unlicensed frequency band), such as a wireless local area network ("WLAN"). In some implementations, access/core network 210 may include a wired access network, such as a fiber optic and/or cable network that provides connectivity to user device 205. While such devices are not explicitly shown in FIG. 2, access/core network 210 may include one or more gateways, routers, hubs, switches, modems, and/or other types of devices that allow user device 205 to communicate with one or more other devices via external network 225.

IMS core 215 may manage authentication, session initiation, account information, a user profile, etc. associated with user device 205 and. In some implementations, the session initiation functionality, performed by IMS core 215, may be performed by a Call Session Control Function ("CSCF"), and may be performed using Session Initiation Protocol ("SIP") signaling. IMS core 215 may include one or more gateways, such as a media gateway ("MGW") and/or a PSTN gateway, which may assist in converting signaling protocols between different types of networks (e.g., between access/core network 210, a PSTN, an IP-based network such as the Internet, etc.). The CSCF, and/or one or more other devices of IMS core 215, may assist in routing telephone calls (e.g., VoIP calls, Voice over LTE ("VoLTE") calls, PSTN calls, etc.) to and/or from user device 205.

For example, TMDN server 220 may assist in routing calls to and/or from one or more user devices that are in a group of devices that have a shared MDN. TMDN server 220 may, in some implementations, be communicatively coupled to, or implemented as part of, a CSCF and/or another device within IMS core 215. In other implementations, TMDN server 220 may reside within access/core network 210 (e.g., in lieu of within IMS core 215), and/or may be an "over the top" device, reachable via external network 225 (e.g., via the Internet). Example functionality of TMDN server 220, in accordance with some implementations, is explained further below with respect to FIG. 3. Generally, TMDN server 220 may assign a TMDN to a particular user device 205 when the particular user device 205 is in a group of user devices 205 that share an MDN, and when the particular user device 205 places an emergency call (e.g., a call to PSAP 230). TMDN server 220 may route the call, including the TMDN, to PSAP 230, and may further assist in routing calls, that indicate the TMDN as the callee, to the particular user device 205.

External network 225 may include one or more packet data networks ("PDNs"), such as the Internet, a metropolitan area network ("MAN"), a local area network ("LAN"), a wide area network ("WAN"), a private enterprise network, etc. External network(s) 225 may be "external" to access/core network 210, in the sense that data transmission to and/or from user device 205, via external network 225, may not be controlled by a carrier associated with access/core network 210 and/or may be via devices and/or networks not owned or operated by the carrier. External network 225 may additionally, or alternatively, include one or more circuit switched networks, such as a PSTN.

PSAP 230 may include one or more communication and/or routing devices, and may handle emergency calls (e.g., "9-1-1" calls). PSAP 230 may, for example, include telephone devices, desktop workstations, etc. PSAP 230 may include, and/or may be in communication with, devices that may provide location information associated with callers. For example, PSAP 230 may automatically determine or receive location information in conjunction with calls. In some implementations, PSAP 230 may receive the location information from TMDN server 220 and/or another device (e.g., a location database, which may be maintained by a carrier associated with access/core network 210 and may be located within access/core network 210 and/or may be accessible via external network 225).

Figures 3, 4:
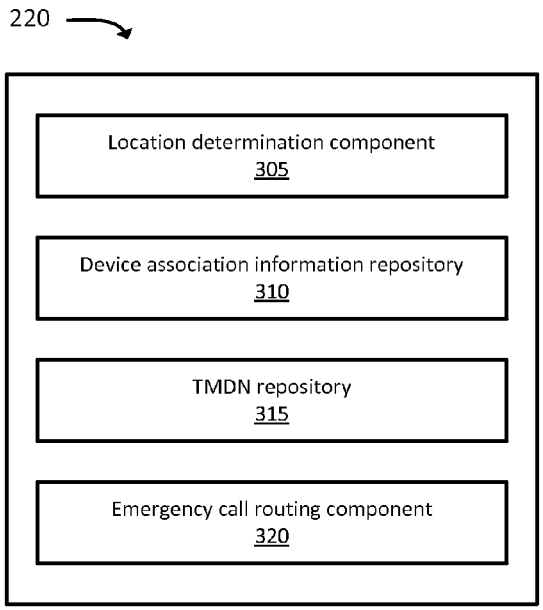
FIG. 3 illustrates example functional components of a temporary mobile directory number ("TMDN") server, in accordance with some implementations.
FIG. 4 illustrates an example data structure that may be stored by a TMDN server, in accordance with some implementations.

FIG. 3 illustrates example functional components of TMDN server 220, in accordance with some implementations. As shown, TMDN server 220 may include location determination component 305, device associated information repository 310, TMDN repository 315, and emergency call routing component 320. Components 305-320 may be implemented as hardware circuitry and/or software logic. In some implementations, the functionality of one module may be performed by another module, and/or the functionality of multiple modules may be performed by one module. In some implementations, TMDN server 220 may include additional, fewer, different, or differently arranged components.

Location determination component 305 may determine a location of one or more user devices 205. The location may be determined, in some implementations, as part of a registration process. For example, when user device 205 initially attaches to access/core network 210 and/or the geographic location of user device 205 changes, access/core network 210 may determine the location of user device 205 (e.g., using cellular triangulation and/or another technique) and may report the location to location determination component 305. In some implementations, the location of user device 205 may be provided by user device 205. For instance, user device 205 may include Global Positioning System ("GPS") circuitry and/or logic, and/or may use some other technique, to determine its own location. In some implementations, user device 205 may receive manual input (e.g., from a user of user device 205), indicating the location of user device 205 (e.g., in terms of an address). When the location is expressed in terms of an address, location determination component 305 may validate the address and/or determine a set of latitude and/or longitude coordinates associated with the address. For example, location determination component 305 may communicate with an external device and/or service that allows the validation and/or determination of the coordinates. In some implementations, location determination component 305 may determine the location of user device 205 when TMDN server 220 receives a call notification, indicating that user device 205 has placed a call. In some implementations, location determination component 305 may determine the location of user device 205 when TMDN server 220 receives a call notification, indicating that user device 205 has placed an emergency call (e.g., a "9-1-1" call).

Device associated information repository 310 may receive and/or store information indicating groups of devices that are associated with the same MDN. Device associated information repository 310 may receive the information from a carrier associated with access/core network 210, and/or from another source. Device associated information repository 310 may, for example, receive the information when respective user devices 205 are purchased and/or are initially registered with a service by which multiple user devices 205 are associated with the same MDN.

TMDN repository 315 may receive and/or store information regarding TMDNs that may be assigned to user devices 205 (e.g., when user devices 205 place emergency calls). TMDN repository 315 may store a pool of TMDNs, and may store information indicating whether a particular MDN has already been assigned (e.g., is unavailable) or not (e.g., is available). TMDN repository 315 may also manage the revocation of TMDNs, after they have been assigned. For example, TMDN repository 315 may revoke a TMDN after a particular amount of time has elapsed since the TMDN was assigned to a particular user device 205 (e.g., after one hour, after six hours, etc.). In some implementations, TMDN repository 315 may revoke TMDNs in a more dynamic fashion. For instance, TMDN repository 315 may revoke TMDNs, on a first-in-first-out basis, once the quantity of available TMDNs falls below a threshold. In this manner, the length of time that TMDNs are assigned to user devices 205 may be longer than if the TMDNs were revoked after a static amount of time, and/or TMDNs may be made more readily available in situations where a relatively high quantity of TMDNs are needed.

Emergency call routing component 320 may receive call notifications (e.g., SIP INVITE messages and/or other types of call notifications), indicating that user device 205 has placed a call. Emergency call routing component 320 may determine whether the call is an emergency call, and may assign a TMDN to user device 205 when the call is an emergency call, and when user device 205 is in a group of devices that share an MDN. Emergency call routing component 320 may route the call, including the TMDN, to PSAP 230. In some implementations, routing the call may include identifying the right PSAP 230, based on the location of user device 205. Routing the call may also include providing the location information to PSAP 230, and/or to one or more intermediate routing devices (which themselves may select the correct PSAP 230, based on the location of user device 205). Routing the call may also include providing the TMDN with the call notification (e.g., in lieu of the shared MDN associated with user device 205), so that PSAP 230 may subsequently use the TMDN (e.g., to call and/or locate user device 205).

FIG. 4 illustrates example data structure 400, which may be stored by TMDN server 220. As shown, data structure 400 may include a device identifier ("ID") column, an MDN column, a location column, a TMDN column, and a TMDN timestamp column. Each record (e.g., row, in this example) may correspond to a single user device 205. In practice, other variations are possible (e.g., each record may correspond to a particular MDN, and/or may have some other arrangement). In some implementations, data structure 400 may store additional information, compared to that shown in FIG. 4. For example, data structure 400 may store information regarding a make and/or model of user devices 205, device capabilities of user devices 205 (e.g., screen resolution, number of audio channels, bandwidth capabilities, etc.), customer information (e.g., names, addresses, or the like) for users of user devices 205, and/or other information.

The device identifier column may include an identifier by which a particular user device 205 can be identified (e.g., by emergency call routing component 320). As shown, the identifier may be, for example, an IP address (with or without a port number) or some other type of identifier (e.g., an International Mobile Subscriber Identity ("IMSI") value, an International Mobile Station Equipment Identity ("IMEI") value, a SIP address (e.g., a Uniform Resource Identifier ("URI")), etc.).

In this example, four user devices 205 are associated with the MDN "123-456-7890," and two user devices 205 are associated with the MDN "321-654-0987"). Further, in this example, the device having the device identifier "1.2.3.4:4321" may have been assigned the TMDN "555-555-5555," based on a call placed at 23:52:01 (i.e., 11:52:01 PM) on Jun. 18, 2015; and the device having the device identifier "9.8.7.6:5432" may have been assigned the TMDN "555-123-4567," based on a call placed at 20:15:52 (i.e., 8:15:52 PM) on Jun. 18, 2015. The information, stored in data structure 400, may be used in accordance with the example operations, performed by TMDN server 220, described herein.

Figure 5:
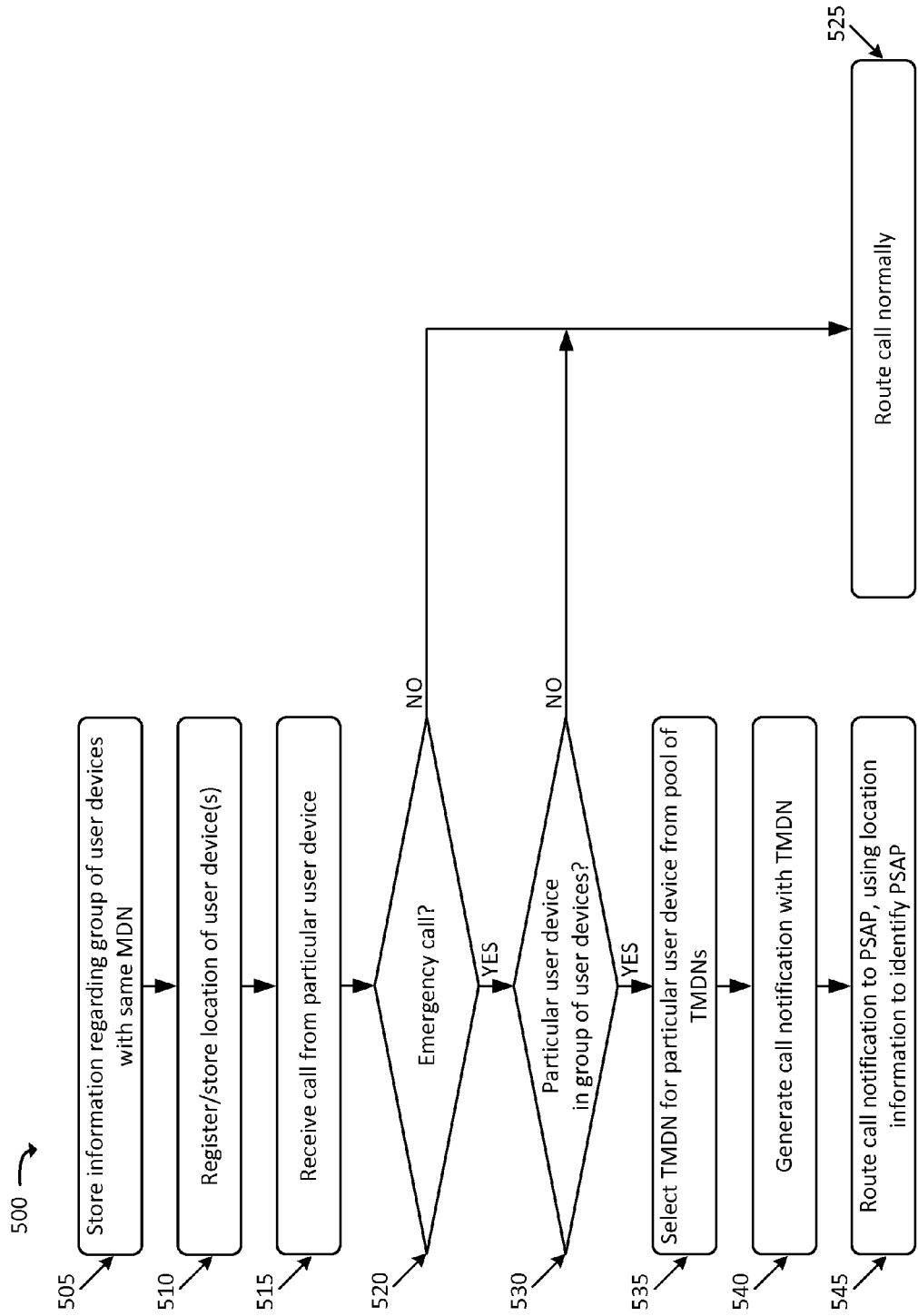
FIG. 5 illustrates an example process for assigning a temporary telephone number to a user device, that is in a group of devices that share the same telephone number, when the user device places an emergency call, and appropriately routing the call.

FIG. 5 illustrates an example process 500 for assigning a temporary telephone number to a user device, that is in a group of devices that share the same MDN, when the user device places an emergency call, and appropriately routing the call. In some implementations, process 500 may be performed by TMDN server 220. In other implementations, some or all of process 500 may be performed by one or more other devices in addition to, or in lieu of, TMDN server 220. FIG. 5 will be explained below, with reference to FIG. 6, which illustrates certain concepts shown in FIG. 5.

Figure 6:
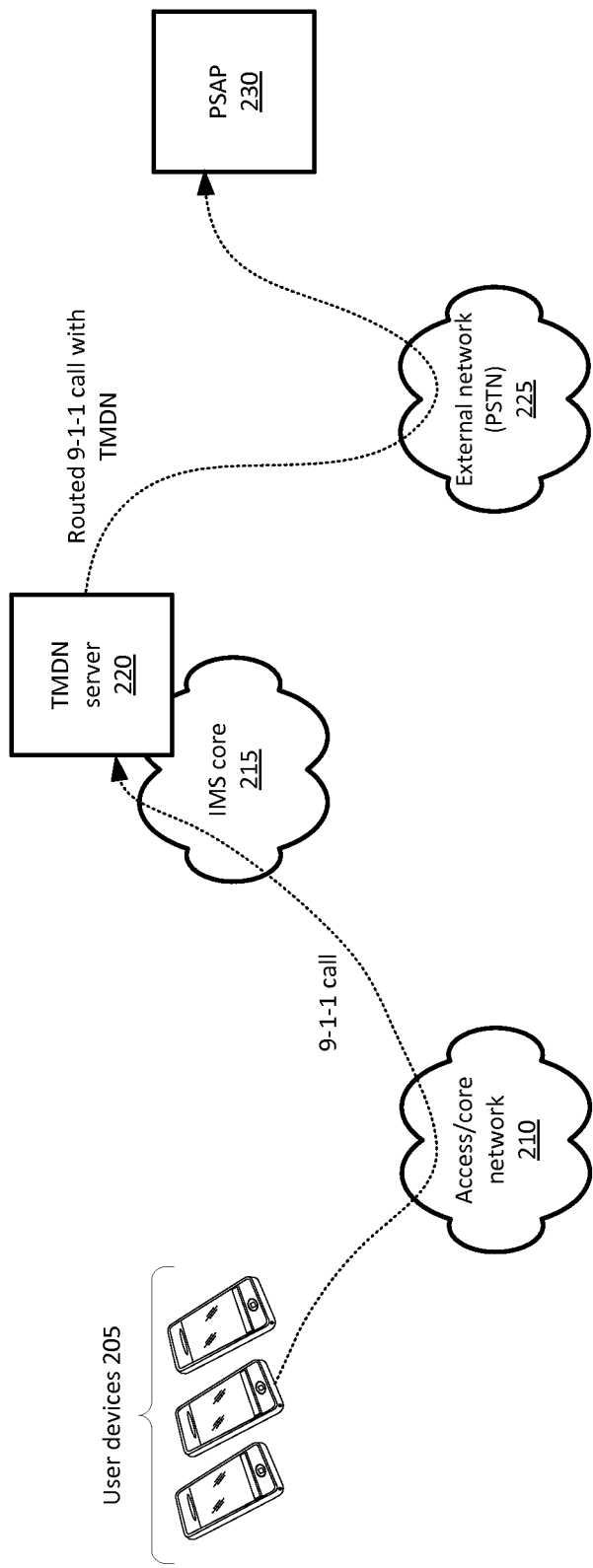
FIG. 6 conceptually illustrates the routing of a call from a device, that has been assigned a temporary telephone number, to an emergency call center.

As shown, process 500 may include storing (at 505) information regarding a group of user devices having the same MDN. For example, as discussed above with respect to device associated information repository 310, TMDN server 220 may store data structure 400 (and/or similar information), that includes information, such as device identifiers, regarding user devices 205 that are associated with the same MDN. For the sake of example, assume that the three user devices 205, shown in FIG. 6, are associated with the same MDN.

Process 500 may also include registering and/or storing (at 510) the location of the user devices. For example, as described above with respect to location determination component 305, TMDN server 220 may determine the location of user devices 205 in one or more ways, including receiving information from a cellular network to which user devices 205 are attached, receiving information ascertained by GPS (or similar) circuitry associated with user devices 205, and/or receiving information manually provided by a user. In some implementations, TMDN server 220 may output the location information to another device (e.g., a server that stores location information associated with user devices 205), and/or the location information may have been provided to another device before or concurrently with the providing of the location information to TMDN server 220.

Process 500 may further include receiving (at 515) a call from a particular user device. For example, as described above with respect to emergency call routing component 320, TMDN server 220 may receive a call from a particular user device 205. Referring to FIG. 6, by way of example, the particular user device 205 may be a user device that has a shared MDN.

Process 500 may additionally include determining (at 520) whether the call is an emergency call. For example, as described above with respect to emergency call routing component 320, TMDN server 220 may determine whether a callee of the call is an emergency call center, such as PSAP 230. TMDN server 220 may, for example, examine a dialed number of the call, and compare the dialed number to one or more numbers (e.g., "9-1-1") that are associated with emergency call centers.

If the call is not an emergency call (at 520—NO), then process 500 may include routing (at 525) the call normally. For example, emergency call routing component 320 may forward the call notification to a conventional call routing device or system, such as a CSCF and/or one or more other devices. The call may be forwarded to the intended non-emergency callee using any technique, including conventional techniques.

If, on the other hand, the process is an emergency call (at 520—YES), then process 500 may further include determining (at 530) whether the particular user device is in a group of user devices that share an MDN. For example, as described above with respect to emergency call routing component 320, TMDN server 220 may identify a device identifier of user device 205 (e.g., by examining an SIP header to obtain an SIP URI, by examining an IP header to obtain a source IP address and/or port, etc.). TMDN server 220 may compare the device identifier to information stored by device associated information repository 310 (e.g., data structure 400), in order to determine whether the particular user device 205 uses a shared MDN.

If the user device is not in such a group (at 530—NO), then process 500 may transition to block 525, and the call may be routed normally (e.g., to PSAP 230, using the MDN associated with the call). If, on the hand, the user device is in such a group (at 530—YES), then process 500 may include selecting (at 535) a TMDN for the particular user device from a pool of TMDNs. For example, as described above with respect to TMDN repository 315 and emergency call routing component 320, TMDN server 220 may select a TMDN for user device 205, based on determining that user device 205 has placed an emergency call and that user device 205 is associated with a shared MDN.

Process 500 may additionally include generating (at 540) a call notification with the TMDN. For example, TMDN server 220 may generate a call notification (e.g., a SIP INVITE message, a Signaling System 7 ("SS7") IAM message, and/or some other type of call notification), which indicates the TMDN as the caller's number.

Process 500 may also include routing (at 545) the call notification to a PSAP, using the location information to identify the PSAP. For example, as described above with respect to emergency call routing component 320, and as also conceptually shown in FIG. 6, TMDN server 220 may route the call notification to PSAP 230. As also mentioned above, the call notification may be routed to PSAP 230 via one or more intermediate devices. In some implementations, the location of user device 205 may be used to route the call notification to the appropriate PSAP 230 (e.g., a PSAP 230 that is closest, in terms of proximity, to user device 205).

PSAP 230 may use the TMDN, included in the call notification, in a variety of ways. For example, if the call is disconnected, PSAP 230 may use the TMDN to call user device 205 back, without ringing other devices with the shared MDN. As another example, PSAP 230 may use the TMDN to look up location information associated with user device 205 (e.g., may query TMDN server 220 and/or another device that stores location information).

Figure 7:
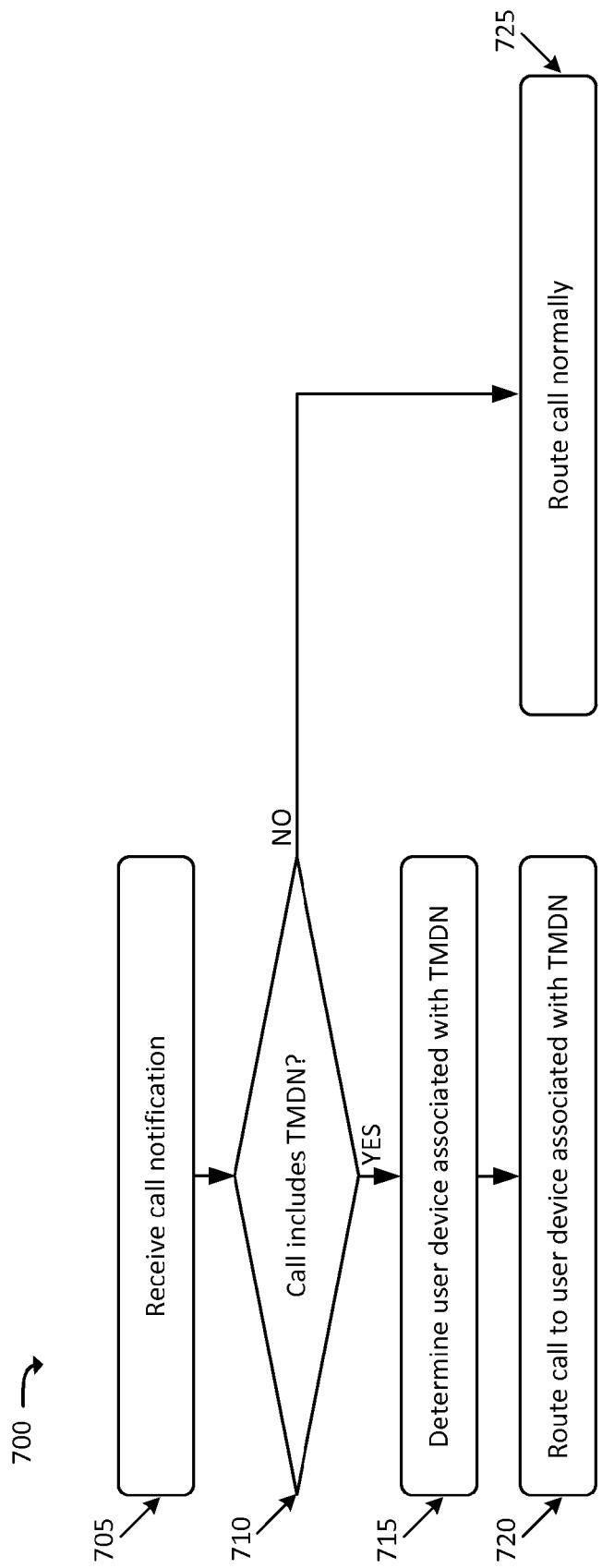
FIG. 7 illustrates an example process for routing a call, to a device that has been assigned a temporary telephone number, to the device.

FIG. 7 illustrates an example process 700 for routing a call, to a device that has been assigned a temporary telephone number, to the device. In some implementations, process 700 may be performed by TMDN server 220. In other implementations, some or all of process 700 may be performed by one or more other devices in addition to, or in lieu of, TMDN server 220.

As shown, process 700 may include receiving (at 705) a call notification. For example, as described above with respect to emergency call routing component 320, TMDN server 220 may receive a call notification. In some situations, this call notification may be received from PSAP 230.

Process 700 may further include determining (at 710) whether the call notification includes a TMDN. For example, TMDN server 220 may check device associated information repository 310 and/or TMDN repository 315 to determine whether an MDN, indicated as the caller's MDN, is a TMDN.

If the call notification includes a TMDN (at 710—YES), then process 700 may include determining (at 715) a user device associated with the TMDN. For example, TMDN server 220 may perform a lookup of data structure 400, in order to identify a device identifier of the caller.

Process 700 may also include routing (at 720) the call to the user device associated with the TMDN. For example, TMDN server 220 may use the device identifier, of the determined user device 205, to route the call to user device 205. In some implementations, the call may not be routed to other user devices 205, even though other devices may share an MDN with the calling user device 205. If, on the other hand, the call notification does not include a TMDN (at 710—NO), then process 700 may include routing (at 725) the call normally.

Figure 8:
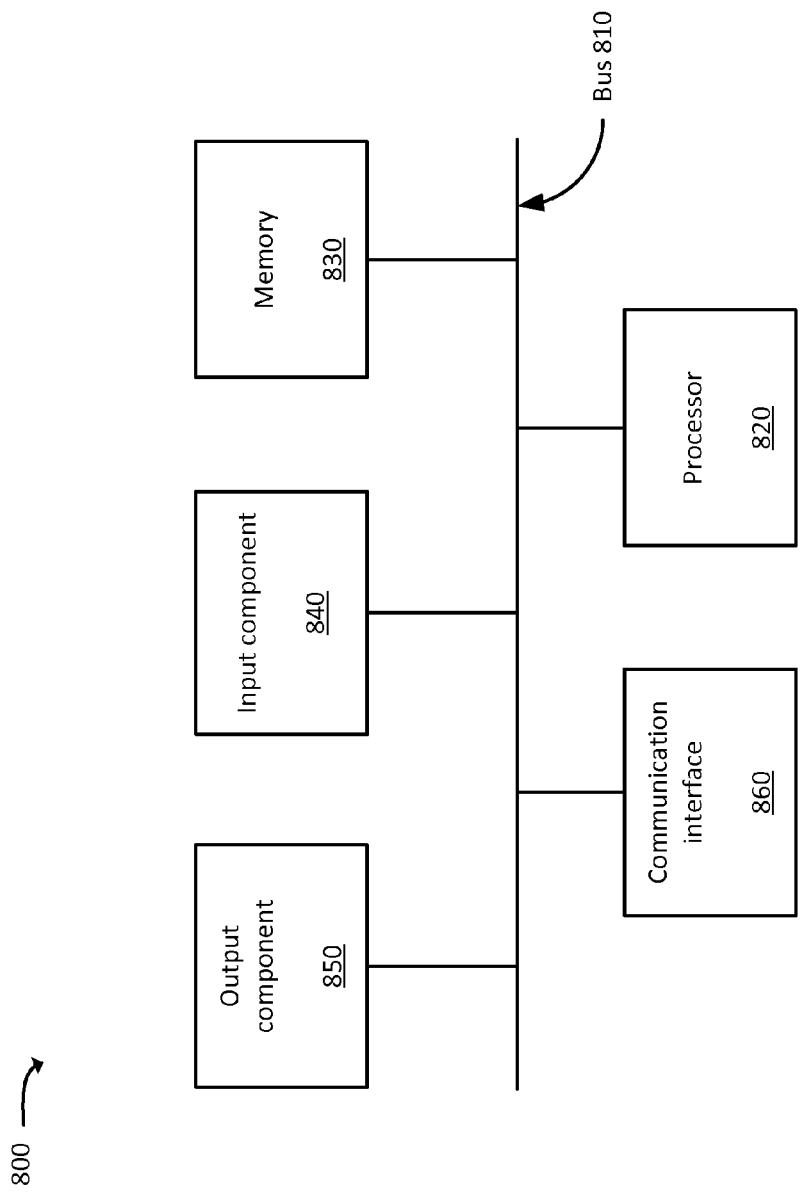
FIG. 8 illustrates example components of a device, in accordance with some implementations described herein.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as one or more cellular radio transceivers, an infrared ("IR") receiver, a Bluetooth® radio transceiver, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 5 and 7, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   a memory device storing a set of processor-executable instructions; and
   a processor configured to execute the processor-executable instructions, wherein executing the processor-executable instructions causes the processor to:
   receive a call notification indicating that a user device has placed a call;

determine that the user device is associated with at least one other user device, the user device and the at least one other user device being associated with a shared first telephone number;

assign, based on the determination, a second telephone number to the user device, the second telephone number being different from the first telephone number;

route the call notification to a callee of the call, the call notification including the second telephone number assigned to the user device; and revoke the second telephone number after a particular duration of time has expired since the second telephone number was assigned to the user device, the revoking making the second telephone number available to assign to other callers.

2. The system of claim 1, wherein the call notification is a first call notification and wherein the call is a first call, wherein executing the processor-executable instructions further causes the processor to:

receive a second call notification regarding a second call, the second call notification indicating that a callee of the second call is the second telephone number;

determine a device identifier, of the user device associated with the second telephone number; and route the second call notification to the user device, the routing being performed based on the device identifier of the user device.

3. The system of claim 2, wherein the device identifier includes at least one of:

an Internet Protocol address, or a Session Initiation Protocol address.

4. The system of claim 1, wherein the call notification is a first call notification and wherein the call is a first call, wherein executing the processor-executable instructions further causes the processor to:

determine a callee of the call; and perform the assigning and routing based on an identity of the callee.

5. The system of claim 4, wherein the callee is an emergency call center, wherein the assigning and routing are performed based on determining that the identity of the callee is the emergency call center.

6. The system of claim 1, wherein the particular duration of time is based on a quantity of available second telephone numbers in a pool of telephone numbers.

7. The system of claim 1, wherein executing the processor-executable instructions further causes the processor to:

query a location database, using the second telephone number;

determine a location of the user device based on the query to the location database; and provide information, indicating the determined location, to the callee of the call.

8. A method, comprising:

receiving, by a network device, a call notification indicating that a user device has placed a call;

determining, by the network device, that the user device is associated with at least one other user device, the user device and the at least one other user device being associated with a shared telephone number;

assigning, based on the determination, a temporary telephone number to the user device;

routing the call notification to a callee of the call, the call notification including the temporary telephone number assigned to the user device; and revoking the temporary telephone number after a particular duration of time has expired since the temporary telephone number was assigned to the user device, the revoking making the temporary telephone number available to assign to other callers.

9. The method of claim 8, wherein the call notification is a first call notification and wherein the call is a first call, the method further comprising:

receiving a second call notification regarding a second call, the second call notification indicating that a callee of the second call is the temporary telephone number;

determining a device identifier, of the user device associated with the temporary telephone number; and routing the second call notification to the user device, the routing being performed based on the device identifier of the user device.

10. The method of claim 9, wherein the device identifier includes at least one of:

an Internet Protocol address, or a Session Initiation Protocol address.

11. The method of claim 8, wherein the call notification is a first call notification and wherein the call is a first call, the method further comprising:

determining a callee of the call; and performing the assigning and routing based on an identity of the callee.

12. The method of claim 11, wherein the callee is an emergency call center, wherein the assigning and routing are performed based on determining that the identity of the callee is the emergency call center.

13. The method of claim 8, wherein the particular duration of time is based on a quantity of available temporary telephone numbers in a pool of temporary telephone numbers.

14. The method of claim 8, further comprising:

querying a location database, using the second telephone number;

determining a location of the user device based on the query to the location database; and providing information, indicating the determined location, to the callee of the call.

15. A system, comprising:

a memory device storing a set of processor-executable instructions; and a processor configured to execute the processor-executable instructions, wherein executing the processor-executable instructions causes the processor to:

assign a temporary mobile directory number ("TMDN") to a user device that is associated with a shared mobile directory number ("MDN"), the shared MDN being associated with at least one other user device;

receive a call notification, indicating that a call has been placed to the user device, the call notification including the TMDN;

route the call notification to the user device, without routing the call notification to the at least one other user device that is associated with the shared MDN; and revoke the TMDN after a particular duration of time has expired since the TMDN was assigned to the user device, the revoking making the TMDN available to assign to other callers.

16. The system of claim 15, wherein executing the processor-executable instructions further causes the processor to:

determine a device identifier, of the user device associated with the TMDN,
wherein the routing is performed based on the device identifier of the user device.

17. The system of claim 16, wherein the device identifier includes at least one of:
an Internet Protocol address, or
a Session Initiation Protocol address.

18. The system of claim 15, wherein the TMDN is assigned to the user device based on determining that the user device has placed a call to an emergency call center.

19. The system of claim 18, wherein the TMDN is assigned to the user device further based on determining that the user device shares the MDN with the at least one other user device.

20. The system of claim 15, wherein the particular duration of time is based on a quantity of available TMDNs in a pool of TMDNs.

* * * * *